United States Patent [19]

Agnoff

[11] Patent Number: 5,088,596

[45] Date of Patent: Feb. 18, 1992

[54] MOTORIZED CONVEYOR ROLLER

[75] Inventor: Charles Agnoff, Wilmington, N.C.

[73] Assignee: Interroll Holding A. G., Switzerland

[21] Appl. No.: 628,377

[22] Filed: Dec. 17, 1990

[51] Int. Cl.$^5$ ............................................. B65G 13/06
[52] U.S. Cl. ................................................... 198/788
[58] Field of Search ............................... 198/788, 781

[56] References Cited

U.S. PATENT DOCUMENTS

| 1,825,119 | 9/1931 | Mug ..................... | 198/788 |
| 2,013,858 | 9/1935 | Lawlor .................. | 198/775 |
| 2,175,860 | 12/1937 | Waimann ............... | 198/788 |
| 2,915,167 | 12/1959 | Berger ................... | 198/788 |

FOREIGN PATENT DOCUMENTS 2616418  12/1988  France .................. 198/788

Primary Examiner—Joseph E. Valenza
Assistant Examiner—Keith L. Dixon
Attorney, Agent, or Firm—Rhodes, Coats & Bennett

[57] ABSTRACT

A motorized conveyor roller is mounted in a conveyor frame to support and propel articles from one end of the conveyor path towards the opposite end. The conveyor roller includes a roller tube rotatably mounted in the conveyor frame and a drive means contained inside the roller tube for driving the roller tube. The drive means includes a motor; a gear reducer assembly operatively connected to the motor; and a drive member connected to the output shaft of the speed reducer for engaging and rotating the roller tube. The drive member preferably includes an elastomeric means for frictionally engaging the inner wall of the roller tube, and a clutch means adapted to slip at a predetermined torque to protect the motor and gear reducer assembly from torque overload.

21 Claims, 3 Drawing Sheets

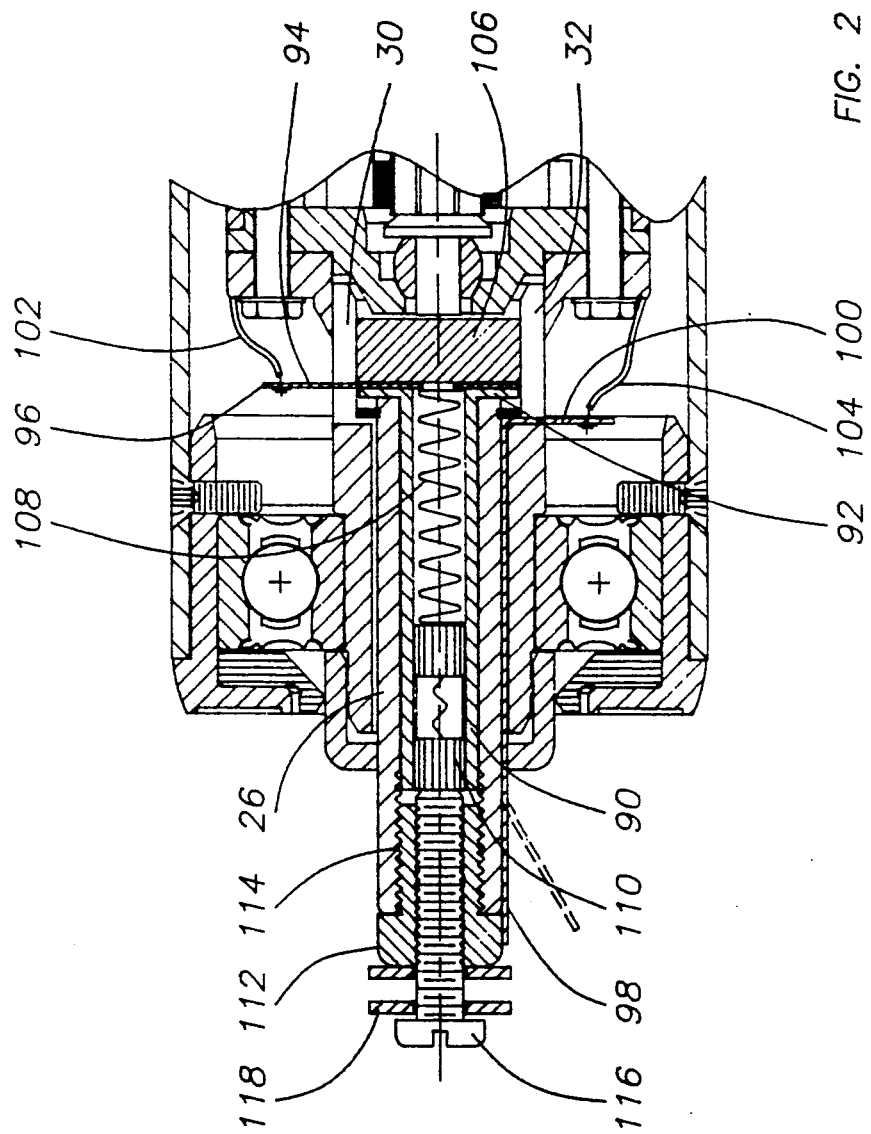

MOTORIZED CONVEYOR ROLLER

BACKGROUND OF THE INVENTION

The present invention relates generally to a roller conveyor system and more particularly to a motorized conveyor roller in which the motor and drive gear is contained inside the roller.

Typically, a roller conveyor system comprises a plurality of rollers rotatively mounted in a conveyor frame so as to define a path upon which articles are conveyed. Several rollers function as "drive rollers" to engage and propel the articles from one end of the conveyor path towards the opposite end. A conventional drive arrangement for such systems typically makes use of a separate electric motor, gear reducer, mounting frame, bearings, couplings and various hardware to provide a means of driving the rollers. The rollers themselves may be fitted with sprockets, or grooves to accommodate the drive chain or belt or, alternatively, the rollers may be driven a continuous flat belt which contacts the bottom airface of all the driven rollers. Such external drive arrangements take up a relatively large amount of space, require frequent servicing, and are not suited for dusty or wet environments.

To overcome these problems with external drive arrangements, motorized conveyor rollers have been used in the past in which the motor and drive gear is contained inside the roller. One such device is disclosed in the patent to Burger, U.S. Pat. No. 2,915,167, which is representative of the prior art in this field. Motorized conveyor rollers typically include a drum which is rotatably mounted on two end shafts, a motor fixedly secured to one shaft, and a gear reduction assembly which drives the drum.

There are several drawbacks associated with the motorized conveyor of the type shown in the patent to Burger. First, because the prior art motorized conveyor rollers use A/C motors, the roller must have a relatively large diameter in order to make room for the stator. Secondly, prior art designs make use a high voltage single phase or three phase alternating current which requires external wiring to deliver current to the motor. This external wiring is not only expensive and time consuming to install, but also poses a safety hazard to those working nearby.

Another concern with motorized conveyors is torque overload. When articles transported by the conveyor jam, it is desirable that the drive rollers stop rotating to protect not only the articles being transported, but also the motor and gear assembly. In some previous designs of motorized conveyor rollers, a clutch has been interposed between the motor and gear reducer assembly which slips at a predetermined torque. This arrangement, however, causes a relatively high degree of wear on the clutch parts since the motor rotates at substantially higher speed than the roller. This wear also causes the slip torque to vary unpredictably.

Yet another concern with motorized conveyors is with maintenance. Because the motor and gear assembly is located inside the roller tube, it is desirable to provide for easy access to internal components so that they can be serviced, replaced or repaired.

SUMMARY AND OBJECTS OF THE INVENTION

The present invention is a conveyor roller including a self-contained drive assembly for rotating the roller. The conveyor roller includes a hollow roller tube having mounting shafts rotatably journalled in each end thereof. The mounting shafts are adapted to non-rotatably engage the conveyor frame. A DC permanent magnet motor is fixedly secured to one of the mounting shafts by a mounting stud. The motor drives a gear reducer assembly which in turns drives a drive member. The drive member includes an elastomeric means frictionally engaged with the inside of the roller tube. Thus, torque is applied to the roller tube by the drive member, to rotate the roller tube.

To protect the motor and gear train from torque overload, the drive member includes a clutch mechanism comprising a pair of clutch plates disposed on opposite sides of the drive member. A spring resiliently urges the clutch plates against the surfaces of the drive member. The force exerted by the spring determines the "break away torque" at which the clutch will begin to slip.

In a preferred embodiment of the invention, current is supplied to the motor through one of the mounting shafts. The mounting shaft is formed with an axial opening in which an insulator sleeve is disposed. An electrical conductor means passes through the insulator sleeve to provide an electrical path between the positive terminal of the motor and an external power source. The negative or ground path is provided by the motor shaft which is grounded to the conveyor frame. Thus, the present invention provides single point wiring.

Based on the foregoing, it is a primary object of the present invention to provide a motorized conveyor roller in which the drive assembly is fully enclosed inside the roller where it can be protected from dust, moisture, and other foreign substances.

Another object of the present invention is to provide a motorized conveyor roller which is constructed in such a manner that the drive assembly can be easily reached for servicing, repair and replacement.

Still another object of the present invention is to provide a motorized conveyor roller which includes a self-contained drive assembly which can be installed inside the roller tube as a unit.

Still another object of the present invention is to provide a motorized conveyor roller having means to protect the motor and gear assembly from torque overload.

Yet another object of the present invention is to provide a motorized conveyor roller requiring only single point wiring, and in which the conveyor frame serves as a negative ground path.

Still another object of the present invention is to provide a motorized conveyor roller in which the power supply includes an electrical conductor means extending through one of the mounting shafts of the conveyor roller.

Still another object of the present invention is to provide a motorized conveyor roller including electrical overload protection by means of a fuse contained internally inside the shaft conveyor roller.

Other objects and advantages of the present invention will become apparent and obvious from a study of the following description and the accompanying drawings which are merely illustrative of such invention.

BRIEF DESCRIPTION OF THE DRAWINGS

FIG. 2 is a partial longitudinal section view of the end of the motorized conveyor roller.

DETAILED DESCRIPTION OF THE INVENTION

Figure 1:
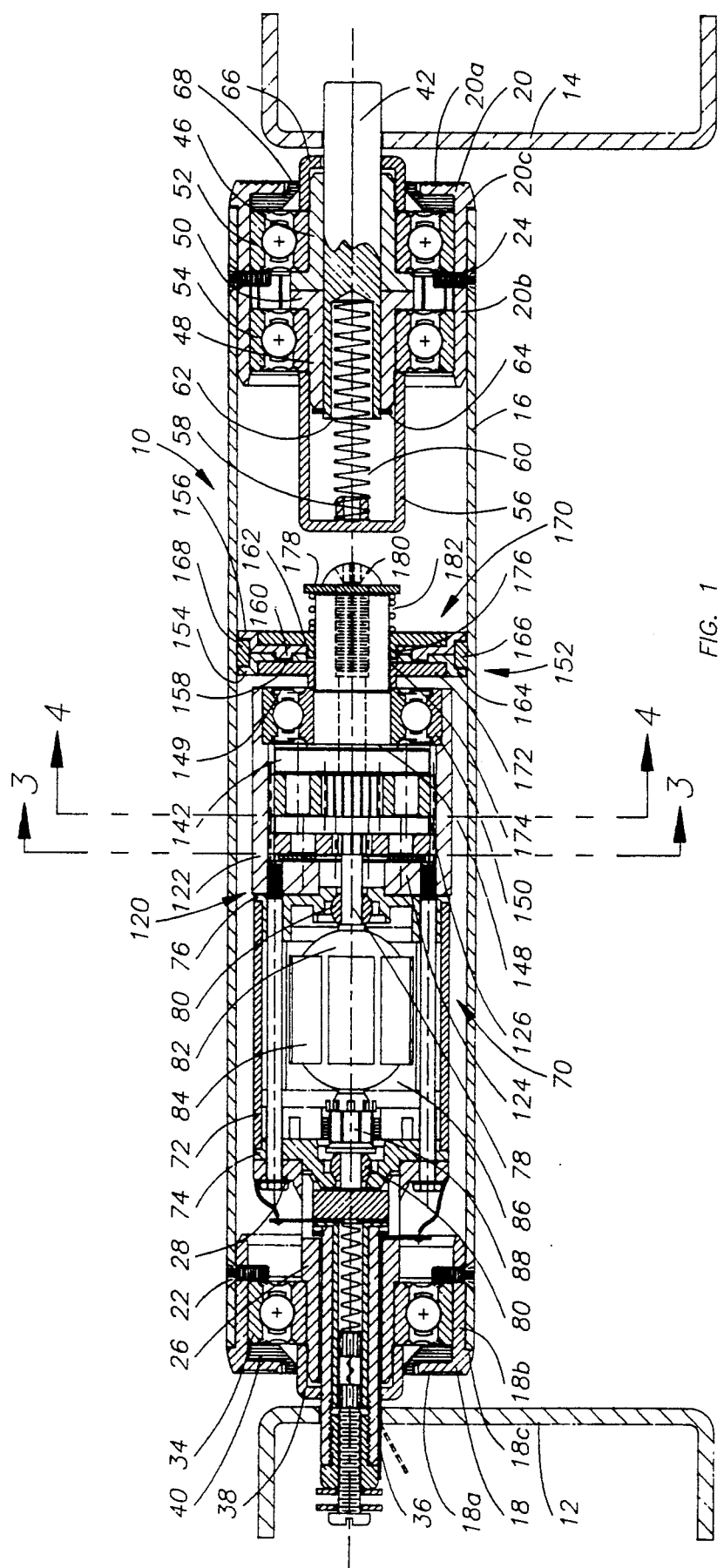
FIG. 1 is a longitudinal section view of the motorized conveyor roller of the present invention.

Referring now to the drawings, and particularly to FIG. 1, the conveyor roller of the present invention is shown therein and indicated generally by the numeral 10. The conveyor roller 10 is adapted to be mounted between parallel frame members 12 and 14 and together with other conveyor rollers defines a conveyor track.

The conveyor roller 10 consists of a hollow roller tube 16. End caps 18 and 20, which are preferably made of an insulating material, are pressed into respective ends of the roller tube 16. The end caps 18 and 20 each include an end wall portion 18a, 20a and a sleeve portion 18b, 20b. The sleeve portions 18b, 20b of the end caps 18 and 20 have an outside diameter approximately equal to the inside diameter of the roller tube 16 and should preferably provide a snug fit. The end wall portions 18a and 20a each have a diameter approximately equal to the outside diameter of the roller tube 16 and define a flange 18c, 20c which abuts against the ends of the tube. The end caps 18 and 20 are secured to the roller tube 16 by securing screws 22 and 24.

Disposed inside the roller tube 16 is an electric motor indicated generally by the numeral 70, a gear reducer assembly indicated generally at 120, and a drive member indicated generally at 152. The motor 70 is supported at one end by a mounting adapter 26. The mounting adapter 26 includes a flange 28 which abuts one end of the motor housing. The mounting adapter 26, motor 70, and gear reducer assembly 120 are bolted together by a plurality of bolts disposed about the periphery of the mounting adapter flange to form a self-contained drive assembly which can be installed as a single unit.

The mounting adapter 26 is journaled in a bearing 34 which is pressed into the end cap 18. Axial displacement of the bearing 34 is prevented by the securing screw 22 which captures the bearing 34. A first mounting shaft 36 is coaxially disposed in the mounting adapter 26. The first mounting shaft 36 is held non-rotatable with respect to the mounting adapter 28 by any suitable means. In the disclosed embodiment, the mounting shaft 36, as well as the inside of the mounting adapter 26, are hexagonally shaped. A spacer 38 having a hexagonal opening slides over the end of the mounting shaft 36 and snugly fits on mounting adapter 26. The purpose of the spacer 38 is to space the end of the roller tube 16 from the conveyor frame. A seal 40 is also provided to prevent contaminents from entering the interior of the roller tube 16.

Referring now to the opposite end of the conveyor roller 10, it is seen that it is supported in a similar manner. A second mounting shaft 42 is coaxially disposed inside a pair of plastic adapters 46 and 48. Each adapter 46 and 48 includes a flange 50. The adapters 46 and 48 are turned so that their flanges 50 abut. Each adapter 46 and 48 is journalled in a respective bearing 52 and 54 and the flanges 50 serve as a spacer between the bearings 52 and 54. The outermost bearing 52 is prevented from axial displacement by the securing screws 24. The innermost bearing 52 is held in place by a spring cap 56 which fits snugly over the end of the innermost adapter 48. The spring cap 56 is, in turn, held in place by a detent (not shown). A boss 58 is formed on the inside of the spring cap 56. One end of a compression spring 60 fits over the boss 58 while the opposite end of the spring extends into an axial opening 62 formed inside the mounting shaft 42. The spring 60 is compressed partially during assembly so that the mounting shaft 42 is biased to an extended position as shown in FIG. 1. A retaining ring 64 holds the shaft. A spacer 66 slides over the end of the second mounting shaft 42 and fits snugly on the end of adapter 46. A seal 68 seals the opening of the end cap 20 to prevent contaminents from entering the roller tube 16.

The first and second mounting shafts 36 and 42 are aligned along the longitudinal axis of the roller tube 16. Both are adapted to engage in hexagonally-shaped openings in respective frame members 12 and 14. To insert the conveyor roller 10 into the conveyor frame, the first mounting shaft 36 is tilted and inserted into a respective opening in frame member 12. After the first mounting shaft is engaged with the frame member 12, the second mounting shaft 42 is pushed inwardly against spring 60 to a retracted position. The end of the conveyor roller is then dropped into position. Once the roller is properly positioned, the mounting shaft 42 will snap back to the extended position to engage the opening in the frame member 14. The mounting shafts 36 and 42 are thus held non-rotatably in the conveyor frame. Consequently, the mounting adapter 26, motor 70, and gear reducer assembly are also held stationary. The roller tube 16, however, being mounted on bearings 34, 52 and 54, will be able to rotate when power is applied.

The motor 70, gear reducer assembly 120, and drive member 152 drive the roller. The motor 70, though shown in cross-section, is a conventional DC permanent magnet motor. The motor 70 includes a cylindrical housing 72 having end plates 74 and 76 mounted at each end thereof. A motor shaft 78 extends axially through the housing 72 and is journalled at each end in a self-aligning bearing 80. A rotor 82 having a plurality of fields 84 is carried on the motor shaft 78. Two semi-cylindrical permanent magnets 86 having opposite polarities surround the rotor 82. A commutator 88 is mounted at one end of the motor shaft 78 and is responsible for reversing current flowing through the rotor fields 84 in the usual manner. As is well-known to those skilled in the art, the current flowing through the rotor fields 84 produces a magnetic field which reacts with the magnetic fields of the permanent magnets 86 to rotate the rotor 82 and consequently the motor shaft 78.

The power to the motor 70 is supplied through the first mounting shaft 36 which is hollow. The electrical supply is shown best in FIG. 2. An insulating sleeve 90 is disposed inside the first mounting shaft and includes a flange 92. A positive plate 94 is disposed on one side of flange and includes a positive terminal 96 which projects through a slot 30 on one side of the non-conductive mounting adapter 26. A ground plate 98 extends along the side of the mounting adapter 26 and includes a ground terminal 100 which projects through a second slot 32 in the mounting adapter 26. First and second conductors 102 and 104 carry current from respective plates to the motor 70. A rubber plug 106 applies positive pressure to the electrical plates. As seen in FIG. 2, the ground plate 98 makes contact with the mounting shaft 36, which is made of metal and is therefore conductive. The mounting shaft 36 is, in turn, in contact with the frame member 12. Thus, the mounting shaft and frame member 12 may serve as the ground path of the electrical supply. This feature produces a substantial savings in the cost of wiring. Alternatively, the ground plate 98 can be bent outwardly as shown in dotted lines in FIG. 2 to serve as a terminal to which a negative conductor is attached.

Current is supplied to the positive plate 94 through the mounting shaft 36. A spring 108 is disposed inside the insulating sleeve and engages the positive plate. The opposite end of the spring contacts a fuse 110 which is also within the insulating sleeve 90. A plastic plug 112 is threaded into the end of the mounting shaft 36 which includes a threaded opening 114 extending axially through the plug. A screw 116 is threaded into the opening in the plug so that the end of the screw makes contact with the fuse 110. Two metal washers 118 disposed around the screw provides means for clamping a supply wire. The screw 116, fuse 110 and spring 108 together provide a conductive path between the positive plate 94 and an external power source.

The gear reducer assembly 120 is a two-stage planetary gear assembly. The gear reducer assembly 120 includes a gear housing 122. The gear housing includes an end wall 124 into which bolts are threaded to secure the gear reducer assembly 120 to the motor 70. A ring gear 126 is formed on the inside of the gear housing 122.

Figure 3:
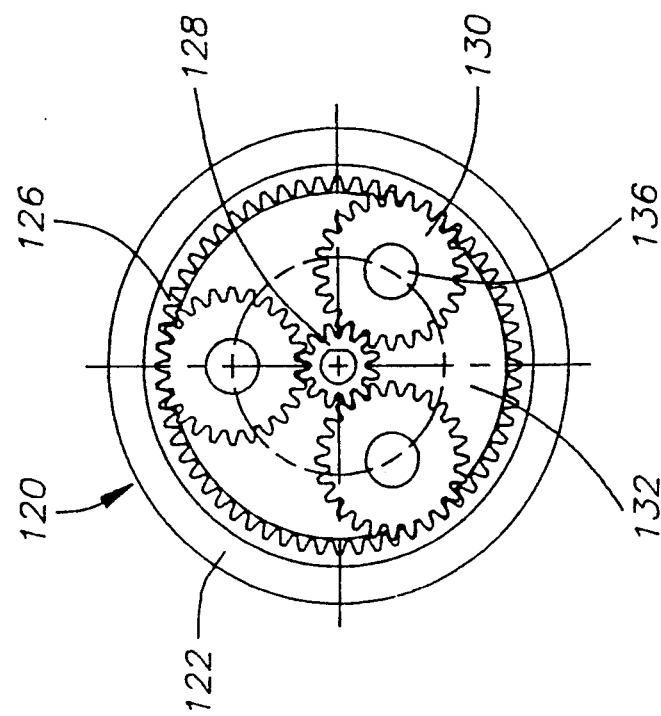
FIG. 3 is a cross-section of the motorized conveyor roller taken through line 3—3 of FIG. 1.

Referring now to FIG. 3, the first stage of the gear reducer assembly is shown. The first stage includes a pinion gear 128, three planetary gears 130, and an input carrier 132. The pinion gear 128 is keyed on the motor shaft 78 and is meshed with all three planetary gears 130 which are also meshed with the ring gear 126. The input carrier 132 has three lugs 136 projecting from one side which are integrally formed with the input carrier 132. The planetary gears 130 are rotatively mounted on respective lugs 136.

Figure 4:
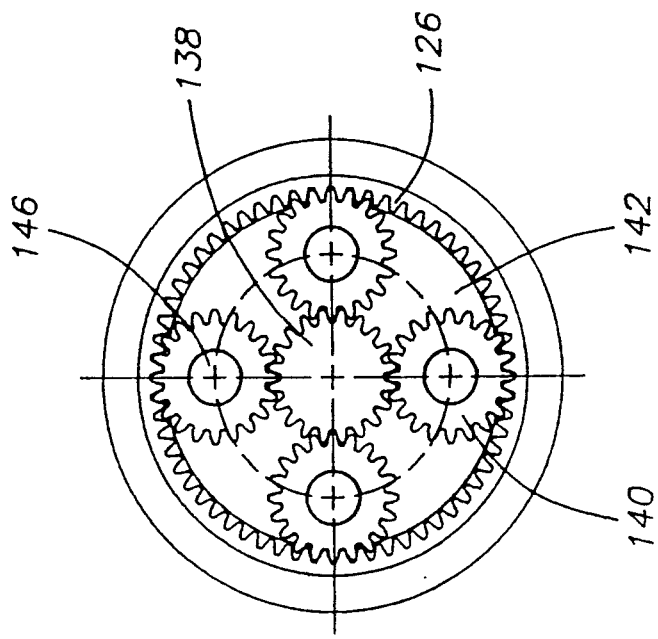
FIG. 4 is a cross-section of the motorized conveyor roller taken through line 4—4 of FIG. 1.

The second stage of the gear reducer assembly, shown in FIG. 4, includes a second pinion gear 138, four second-stage planetary gears 140, and an output carrier 142. The second pinion gear 138 is fixedly mounted at the center of the input carrier 132 on the side opposite the lugs 136. The second pinion gear 138 is meshed with the four second-stage plantary gears 140 which are also meshed with the ring gear 126. The second stage planetary gears 140 are rotatively mounted on lugs 146 extending from one side of the output carrier 142. A hexagonal output shaft 148 extends axially from the opposite side of the output carrier 142 and is journalled in a bearing 150 disposed at the end of the gear housing 122. A seal 149 is applied to the outside of the bearing 150 to retain grease inside the motor housing 72 and gear housing 122.

The drive member 152 is mounted on the output shaft 148 of the output carrier 142. The drive member 152 frictionally engages the inside of the roller tube 16 to drive the roller tube 16. The drive member 152 is specially designed to compensate for manufacturing tolerances in the manufacture of the roller tube 16. Thus, if the roller tube 16 is slightly out of round, the drive member 152 compensates for the lack of roundness. Likewise, the drive member accommodates the range of inside diameter tolerances normally found in such tubes. Additionally, the drive member 152 includes a clutch mechanism 170 to provide protection for the motor 70 and gear reducer assembly 120 from torque overload.

The drive member 152 includes a pair of interlocking drive plates 154 and 156. A first drive plate 154 includes a circular hole 158 in one face while a second plate 156 includes a mating boss 160. Each plate 154 and 156 is provided with a central opening 162 which is larger than the diameter of the shoulders on the drive plates. Each plate also includes a step 164 along its outer periphery so that when the plates are pressed together as shown in FIG. 1, an annular groove 166 is defined. An elastomeric ring 168 is disposed in the annular groove 166 which has an outside diameter slightly larger than the outside diameter of the drive plates 154 and 156. The elastomeric ring 168 engages the inside of the roller tube 16 and should provide a relatively high coefficient of friction. The elastomeric ring 168 compensates for lack of roundness and inside diamter tolerance of the roller tube 16.

The clutch mechanism 170, which also forms a part of the drive member 152, includes a pair of clutch plates 172. The drive plates 154 and 156 are sandwiched between the clutch plates 172 which are in intimate contact with the flat surfaces of the drive plates 154 and 156. Each clutch plate 172 includes a hexagonal opening 174 which is sized to fit the output shaft. Each clutch plate also includes a tubular flange 176 extending from one side thereof. The tubular flange 176 of a first clutch plate serves as a spacer to maintain a predetermined spacing from the gear reducer assembly. The tubular flange 176 of the second clutch plate extends through the central openings 162 of the drive plates 154, 156 and serves as a bearing for the drive plates 154 and 156. A washer 178 and bolt 180, which is threaded into the end of the output carrier, compresses a spring 182 against the outermost clutch plate 172 to maintain a predetermined frictional engagement between the clutch plates 172 and the drive plates 154 and 156. It is important that the break-away torque between the clutch plates 172 and drive plates be less than the break-away torque between the elastomeric ring 168 and its roller tube 16.

Upon energization of the motor 70 which is held stationary by the mounting adapter 26, the first pinion gear 128 will drive the planetary gears 130. Because the planetary gears 130 are mounted on the input carrier 132, the revolution of the planetary gears 130 will drive the input carrier 132. The second stage pinion gear 138, which is mounted on the input carrier 132 drives the second-stage planetary gears 140. The revolution of the second-stage planetary gears 140 will in turn drive the output carrier 142.

The drive member 152 is mounted on the output shaft 148 and drives the conveyor roller 16. The conveyor roller 16 will finally engage articles being transported on the conveyor and propel them along the conveyor track. In the event that the torque between the output shaft 148 and the drive plates 154 and 156 exceeds a predetermined amount, such as when the articles on the conveyor jam, the clutch plates 172 will slip and continue to rotate while the drive plates 154 and 156, and roller tube 16 remain stationary. Thus, the motor 70 and gear reducer assembly 120 will be protected from torque overload.

The present invention may, of course, carried out in other specific ways than those herein set forth without parting from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A motorized conveyor roller comprising: a roller tube; means for rotatably mounting the roller tube in a conveyor frame; a motor mounted inside the roller tube, said motor being non-rotatable relative to the conveyor frame; a gear reducer mounted inside the roller tube and operatively connected to the motor, said gear reducer including an output shaft; a drive member having an outer periphery frictionally engaged with the inner wall of the roller tube for rotating the roller tube, said driving member being driven by the gear reducer output shaft.

2. The motorized conveyor roller according to claim 1 wherein the drive member includes a drive plate assembly having an annular groove extending around its outer periphery, and an elastomeric ring disposed within the annular groove in the drive plate assembly, wherein the elastomeric ring frictionally engages the inner wall of the roller tube.

3. The motorized conveyor roller according to claim 1 wherein the drive member includes clutch means for protecting the gear reducer and motor from torque overloads.

4. The motorized conveyor according to claim 3 wherein the drive member includes a generally circular drive plate having a central opening through which the gear reducer output shaft extends, said drive plate assembly being rotatable freely about the gear reducer output shaft; at least one clutch plate non-rotatably mounted on the gear reducer output shaft and including a generally flat surface adapted to make surface-to-surface contact with the drive plate assembly for driving the drive plate assembly; and means for resiliently urging the clutch plate into contact with the drive plate assembly.

5. The motorized conveyor according to claim 4 wherein the clutch plate includes a tubular sleeve extending axially from the center of the clutch plate upon which the drive plate assembly is rotatably mounted.

6. The motorized conveyor roller according to claim 1 wherein the means for rotatably mounting the roller tube comprises first and second end caps disposed at opposite ends of the roller tube; first and second bearings disposed inside respective end caps; and first and second mounting shafts rotatably journaled in respective bearings and projecting axially from the ends of the roller tube, said first and second mounting shafts being adapted to non-rotatably engage the conveyor frame.

7. The motorized conveyor roller according to claim 6 further including an insulator sleeve disposed within an axial bore formed inside the first mounting shaft, and an electrical conductor means passing through the insulator sleeve for providing an electrical path between the motor and an external power source.

8. The motorized conveyor roller according to claim 7 wherein the electrical conductor means includes a fuse contained inside the mounting shaft to provide electrical overload protection.

9. The motorized conveyor roller according to claim 7 wherein the first mounting shaft is electrically conductive and provides a ground path for the motor.

10. The motorized conveyor roller according to claim 9 wherein the end caps are constructed from an insulating material to electrically isolate the roller tube from the electrical system.

11. A motorized conveyor roller comprising:
a) a roller tube;
b) means for rotatably mounting the roller tube in a conveyor frame so that the roller tube engages article carrier on the conveyor;
c) drive means for rotating the roller tube mounted inside the roller tube to propel the articles carried thereby, the drive means including:
1) a motor mounting;
2) a gear reducer assembly operatively connected to the motor and including an output shaft;
3) a drive member mounted on the output shaft of the gear reducer assembly and including elastomeric means for frictionally engaging the inside of the roller tube to drive the roller tube; and
4) clutch means operatively engaged with the drive member for protecting the motor and gear reducer assembly from torque overload.

12. The motorized conveyor according to claim 11 wherein the drive member includes a pair of interlocking drive plates mounted in side-by-side relationship. each drive plate including a step along its outer periphery which define, in concert, an annular groove, and wherein the elastomeric means is disposed in the annular groove.

13. The motorized conveyor according to claim 12 wherein the clutch means includes a pair of clutch plates disposed on opposite sides of the drive member; and means for resiliently urging the clutch plates into surface-to-surface contact with the drive plates to drive the driving member.

14. The motorized conveyor according to claim 13 wherein at least one clutch plate includes a tubular sleeve extending axially from the center of the clutch plate, and wherein the drive plate is rotatably mounted.

15. The motorized conveyor roller according to claim 11 wherein the means for rotatably mounting the roller tube comprises first and second end caps disposed at opposite ends of the roller tube; first and second bearings disposed inside respective end caps; and first and second mounting shafts rotatably journaled in respective bearings and projecting axially from the ends of the roller tube, said first and second mounting shafts being adapted to non-rotatably engage the conveyor frame.

16. The motorized conveyor roller according to claim 15 further including an insulator sleeve disposed within an axial bore formed inside the first mounting shaft, and an electrical conductor means passing through the insulator sleeve for providing an electrical path between the motor and an external power source.

17. The motorized conveyor roller according to claim 15 wherein the electrical conductor means includes a fuse contained inside the mounting shaft to provide electrical overload protection.

18. The motorized conveyor roller according to claim 16 wherein the first mounting shaft is electrically conductive and provides a ground path for the motor.

19. The motorized conveyor roller according to claim 18 wherein the end caps are constructed from an insulating material to electrically isolate the roller tube from the electrical system.

20. A motorized conveyor roller comprising:
a) a roller tube;
b) means for rotatably mounting the roller tube in a conveyor frame so that the roller tube engages articles carried on the conveyor, the mounting means including:

1) first and second end caps made from an insulating material mounted at opposite ends of the roller tube;
2) bearing means disposed inside the first and second end caps; and
3) first and second mounting shafts rotatably journalled in respective bearing means and projecting from opposite ends of the roller tube to engage a conveyor frame, the first mounting shaft being made of an electrically conductive material and having an axial opening extending therethrough;

c) drive means mounted inside the roller tube for rotating the roller tube to propel the articles carried thereon, the drive means including an electric motor, a gear reducer assembly, and a drive member engaged with the inside of the roller tube.

d) electrical supply means for supplying current to the electrical motor including:

1) a power supply having a positive terminal and a negative terminal;
2) a positive plate electrically connected to the motor;
3) electrical conductor means extending through the axial opening in the first mounting shaft to electrically connect the positive plate to a positive terminal of an external power source;
4) insulating means for insulating the electrical conductor means from the first mounting shaft;
5) a ground plate electrically connected to the motor and the first mounting shaft; and
6) wherein the conveyor frame serves as a ground path to electrically connect the mounting shaft to a negative terminal of the external power supply.

21. The conveyor roller according to claim 20 wherein the power supply is a DC power supply, and the electric motor is a DC permanent magnet motor.

* * * * *